United States Patent
Ruthenberg

[11] Patent Number: 6,132,056
[45] Date of Patent: Oct. 17, 2000

[54] APPARATUS FOR CREATING AN ILLUMINATED WATERFALL

[76] Inventor: Douglas Ruthenberg, 10453 Tillery Rd., Spring Hill, Fla. 34608

[21] Appl. No.: 09/106,030

[22] Filed: Jun. 29, 1998

[51] Int. Cl.[7] .................................................. F21V 33/00
[52] U.S. Cl. .......................... 362/96; 362/560; 362/562; 362/565; 239/18
[58] Field of Search .............................. 362/96, 559, 560, 362/562, 565, 580; 239/18, 19, 20

[56] References Cited

U.S. PATENT DOCUMENTS

| | | |
|---|---|---|
| 620,592 | 3/1899 | Just . |
| 1,626,037 | 4/1927 | Holt . |
| 3,894,689 | 7/1975 | Biullingsley ................... 239/18 |
| 4,749,126 | 6/1988 | Kessener et al. ................ 239/12 |
| 4,811,171 | 3/1989 | Viola ............................. 362/32 |
| 4,901,922 | 2/1990 | Kessener et al. ................ 239/12 |
| 4,975,811 | 12/1990 | Fraser et al. ................... 362/96 |
| 5,067,059 | 11/1991 | Hwang ........................... 362/101 |
| 5,067,653 | 11/1991 | Araki et al. .................... 239/18 |
| 5,115,973 | 5/1992 | Fuller et al. .................... 239/20 |
| 5,171,429 | 12/1992 | Yasuo ............................ 210/94 |
| 5,249,744 | 10/1993 | Ruthenberg .................... 239/23 |
| 5,664,864 | 9/1997 | Kuth ............................. 362/32 |

*Primary Examiner*—Sandra O'Shea
*Assistant Examiner*—John A. Ward
*Attorney, Agent, or Firm*—Dennis G. LaPointe; Mason & Associates, P.A.

[57] ABSTRACT

An apparatus for creating an illuminated waterfall comprising a waterfall vessel, the vessel including a front wall, a pack wall, side ends with apertures, a top wall and a bottom wall; the vessel further including a plurality of baffles and/or combinations of baffles with apertures therein for converting turbulent flow to a waterfall stream at an exit to the vessel; and means for illuminating the waterfall. The means for illuminating the waterfall includes a clear rod or a side-light emitting fiber optic cable installed longitudinally within the vessel with a fiber optic light source juxtaposed to one end of the clear rod or cable. The clear rod or the cable may be installed within a clear tube as an alternative embodiment. To further enhance the illumination of the waterfall, alternating tangential cuts in the side-light emitting fiber optic cable sheathing or notches in the clear rod are provided to create hot spots and a reflective film is adhesively secured to those surfaces inside the vessel juxtaposed to the cable or clear rod. A mirror is also juxtaposed to the end of the clear rod or cable to direct excess lighting back toward the rod or cable to further enhance the illumination of the waterfall.

56 Claims, 5 Drawing Sheets

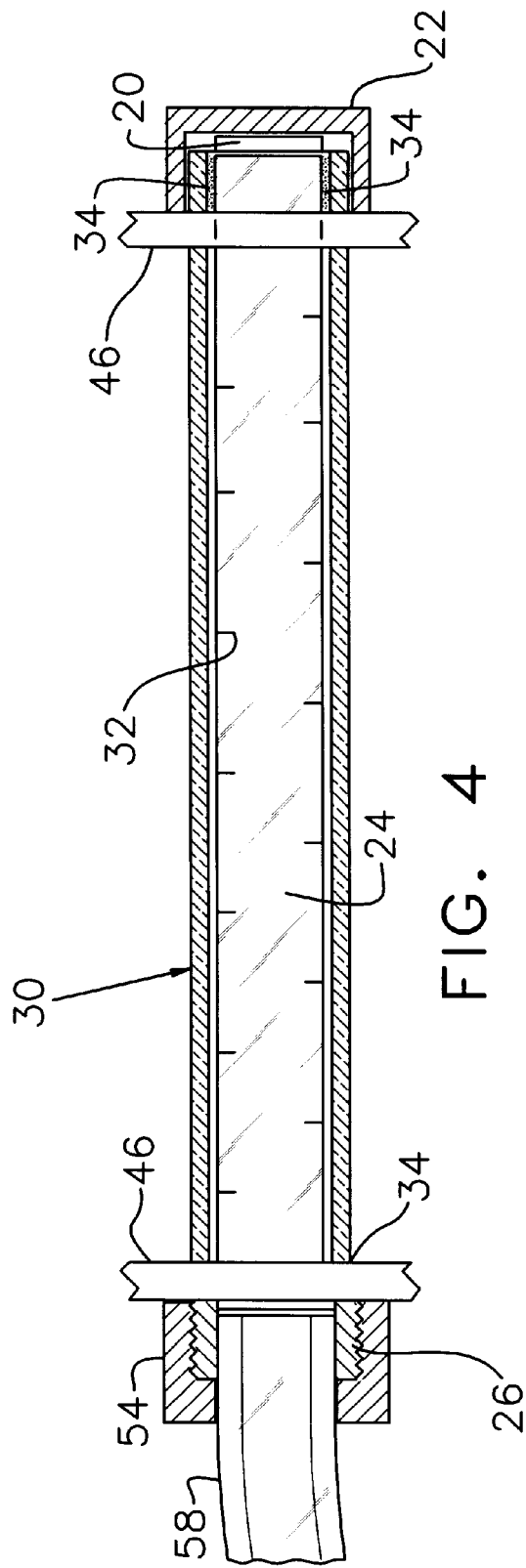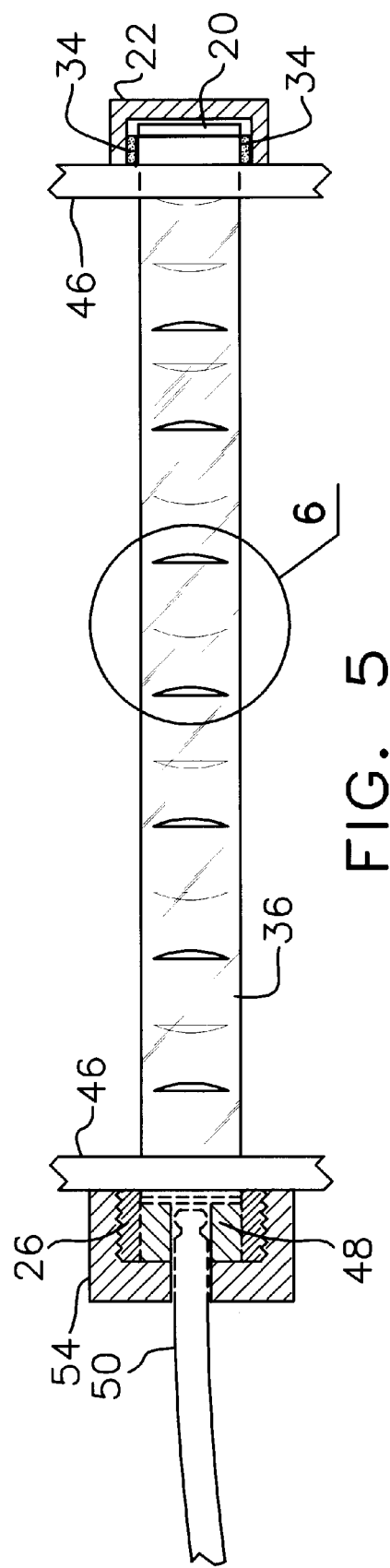

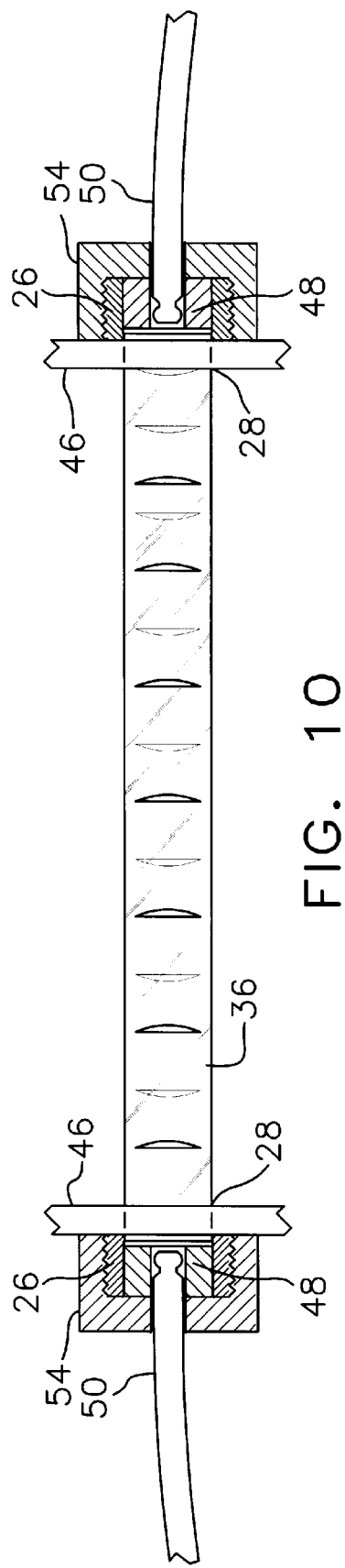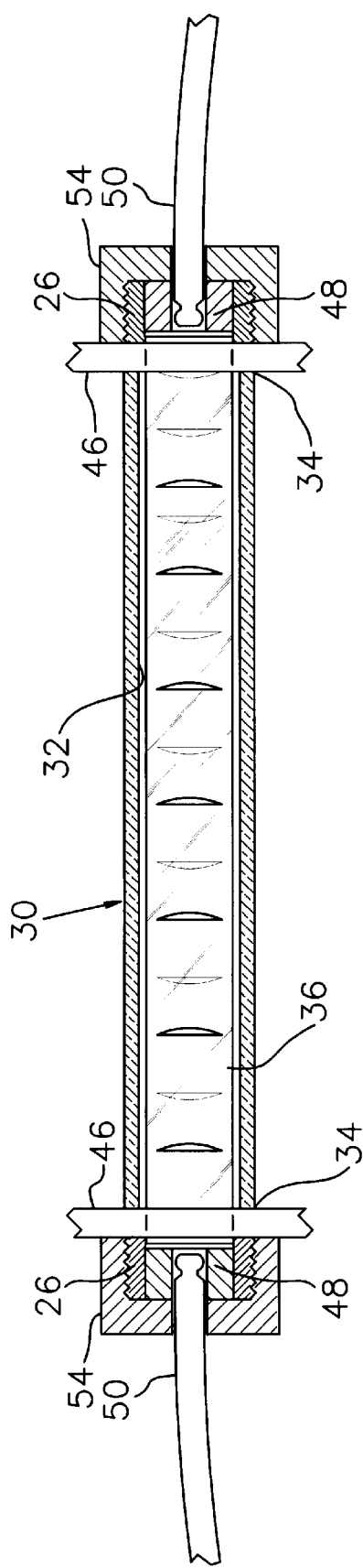

APPARATUS FOR CREATING AN ILLUMINATED WATERFALL

BACKGROUND OF THE INVENTION

1. Field of the Invention

The invention relates to an apparatus for creating an illuminated waterfall.

2. Description of Related Art

Lighted water displays are very popular and generally known in the art. For example, illuminated water fountains are provided by means of light sources which are generally hidden from view and are projected onto a waterfall. The quality of the visual effects of such lighted displays is diminished due to indirect lighting which impairs the view of the lighted waterfall. A known related art includes U.S. Pat. No. 620,592 to Just whose invention projects a light on a screen behind a waterfall.

To overcome visual impairments caused by indirect lighting, other known art incorporated axially lighted water jets as depicted in U.S. Pat. Nos. 4,749,126 and 4,901,922 to Kessener et al.

U.S. Pat. No. 5,067,059 to Hwang depicts an illuminated aquarium ornament wherein the illuminator is fed by fiber optical pipes. U.S. Pat. No. 4,975,811 to Fraser et al. depicts a conical reflector to illuminate and create rainbows in a wall of falling water.

The above-related prior art do not satisfy an object of the present invention which is to provide a combination of a waterfall device with emitting and enhancing lighting means incorporating fiber optic lighting technology inside a waterfall vessel to illuminate the non-turbulent stream of water exiting the vessel to form an illuminated waterfall.

SUMMARY OF THE INVENTION

Therefore an object of this invention is to provide an apparatus for creating an illuminated waterfall. The present invention includes eight different embodiments, although other embodiments are contemplated.

In one embodiment, the apparatus includes means for changing a columnar flow of incoming water from a water inlet pipe into a shallow stream of water having a predetermined breadth greater than the breadth of the inlet pipe so that a waterfall effect is created. The means is referred to as a waterfall vessel which has a top wall, a bottom wall, a front wall, and opposite side ends, which are aligned with the direction of flow of the water in the waterfall vessel as well as an inlet opening for incoming water and an outlet opening for water exiting in the form of a waterfall. Generally, the vessel has a plurality of baffles within the internal compartment of the vessel to convert incoming turbulent water to non-turbulent flow in the outlet opening. A preferred arrangement for the baffles is an X-shaped configuration wherein the surface of each extended leg of the X-shape has a plurality of holes through which water flows and becomes non-turbulent as the water passes from the incoming inlet to the outlet opening.

The illumination is achieved in the first embodiment by inserting a side-light emitting fiber optic, provided with a fiber optic light source adjacent one end of the cable, through an aperture on one end of the waterfall vessel and running the cable longitudinally inside the vessel such that the cable is transversely disposed across the direction of water flow in the waterfall vessel, and extending the end of the cable outside an aperture on the opposite side end of the waterfall vessel. A cap is sealingly fixed to the second end of the vessel and covers the aperture opening to prevent leakage of water to the environment at the aperture area. The cap is generally sized so that its inside diameter is slightly larger than the diameter of the cable which is extended into the cap from inside the vessel. A mirror is juxtaposed to the end of the cable extending outside the opposite second end aperture for reflecting light back in the direction of the cable, and the back of the mirror is adhesively attached to the inside portion of the cap. The mirror may initially be adhesively secured to the end of the cable for ease in assembling and manufacture of the illuminated waterfall assembly.

Where the cable enters the vessel at the vessel's first side end, an adapter is sealingly engaged with the surface of the side end, covering the aperture at the side end. The adapter is further sealingly engaged with the outside surface of the cable thus providing a leak tight engagement at the side end for prevention of water leakage around the cable from inside the vessel.

In order to enhance the emitting of light and to create hot spots to further enhance such lighting, a plurality of inward cuts in an outside sheathing of the cable is provided along the longitudinal extension of the cable inside the vessel. The cuts alternate approximately 90° to 180° apart. Another feature provided to further enhance the illumination of the waterfall includes means for reflecting emitted light along the length of the cable. The preferred means includes a reflective film adhesively attached to portions of the inside surfaces of the baffles, front wall, back wall, and bottom wall juxtaposed to the cable within the vessel. The reflective film does not cover and interfere with any apertures in the baffles.

Another embodiment wherein the side-light emitting cable is used within a waterfall vessel incorporates the above features with the addition of a clear tube longitudinally placed between the apertures of the first and second ends of the vessel. The clear tube extends within the cap at the second end and the cap is sealingly engaged around the outside diameter of the clear tube and second end surface of the vessel to prevent water leakage to the environment from the second end aperture. Similarly, the adapter at the first end of the vessel sealingly engages the clear tube and the cable to prevent water leakage at the first end aperture from the vessel to the environment.

The third and fourth preferred embodiments do not use a side-light emitting fiber optic cable. Rather a clear plastic rod is used in both embodiments. The rod has notches dispersed similar to the cuts in the sheathing of the side-light emitting fiber optic cable that perform the same function as the cuts.

In the third embodiment, the rod is inserted longitudinally between the first and second vessel ends. The rod extends into the cap at the second end. The cap covers a mirror juxtaposed to the end of the rod and the rod end and sealingly engages the surface of the vessel side end around the aperture to prevent water leakage through the aperture from inside the vessel to the environment. The rod also extends into the adapter which is sealingly engaged to the surface around the aperture of the first side end, the adapter further being sealingly engaged to the rod to prevent water leakage at the first end aperture. A fiber optic light is inserted into the adapter and juxtaposed to the end of the rod. The adapter has a coupling portion which joins and maintains the fiber optic light to a juxtaposed position with the end of the rod.

The fourth preferred embodiment includes the features of the third embodiment with the clear rod except that the clear rod is inserted into a clear tube as in the second embodiment. The cap is sealingly engaged at the vessel second end in the same manner as the second embodiment. The adapter is sealingly engaged to the surface of the first end of the vessel around the aperture as well as sealingly engaged to the clear tube as in the second embodiment. The adapter further has a coupling portion which joins and maintains the fiber optic light juxtaposed to the end of the rod.

The above described embodiments are ideal for waterfalls up to about four feet in length. Because of inherent limitations in lighting intensity provided by fiber optic light sources, it is recommended that for longer waterfall vessels with lengths such as four feet long, that one of the remaining four embodiments be used.

The remaining embodiments are respectively similar to the first four embodiments except that the cap with end mirror is not used. Rather, a fiber optic light source is provided from both ends instead of one end.

These and other important objects, features and advantages of the invention will become apparent as this description proceeds.

The invention accordingly comprises the features of construction, combination of elements and arrangements of parts that will be exemplified in the construction hereinafter set forth, and the scope of the invention will be indicated in the claims.

BRIEF DESCRIPTION OF THE DRAWINGS

For a further understanding of the nature and objects of the invention, reference should be made to the following detailed description, taken in connection with the accompanying drawings, in which:

FIG. 4 is a perspective view of the side-light emitting fiber cable inserted within a clear tube with the light source provided at one end.

FIG. 5 is a perspective view of a clear rod inserted between waterfall vessel ends with a fiber optic light juxtaposed to one end of the rod and secured by an adapter coupling portion.

FIG. 10 is a perspective view of a clear rod inserted between waterfall vessel ends with a fiber optic light juxtaposed to both ends of the rod.

FIG. 11 is a perspective view of the of the clear rod inserted within a clear tube and the light source provided at both ends.

DETAILED DESCRIPTION OF THE INVENTION

Figure 1:
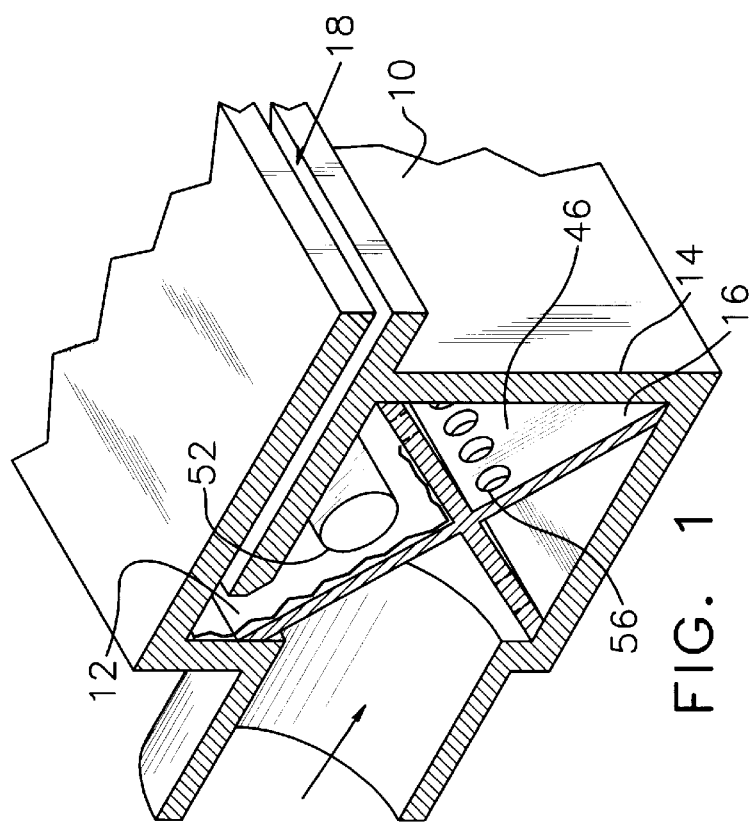
FIG. 1 is a cross-sectional perspective view of the present invention depicting a waterfall vessel with internal baffles and a clear rod longitudinally inserted within the vessel.

This invention is an apparatus for creating an illuminated waterfall. FIG. 1 depicts one embodiment to a waterfall vessel. Vessel 14 typically has a front wall, a back wall, a bottom wall and opposite side ends. Columnar flow of water as shown by the arrow in FIG. 1 enters a vessel and exits in the form of a waterfall at opening 18. Although there are several configurations for which baffles 46 can be arranged within a vessel to convert turbulent columnar water flow to a non-turbulent stream of water, a preferred embodiment is depicted in FIG. 1 wherein the baffles 46 are configured in an X-shaped arrangement and water passes from one chamber formed by the X-shape to another through a plurality of apertures 56 in each of the baffles portions. A light enhancing or emitting means 52 is inserted longitudinally within the chamber formed by the baffles closest the exit opening. The means 52 depicted in FIG. 1 could be a clear plastic rod 36 or a side-light emitting fiber optic cable 24 provided with a fiber optic light source.

Figure 3:
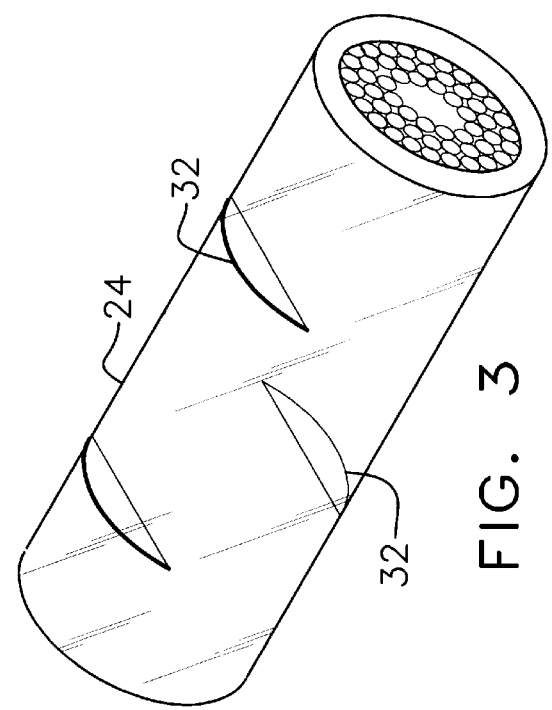
FIG. 3 is a blow-up perspective view if the cuts in a sidelight emitting fiber optic cable.
Figure 2:
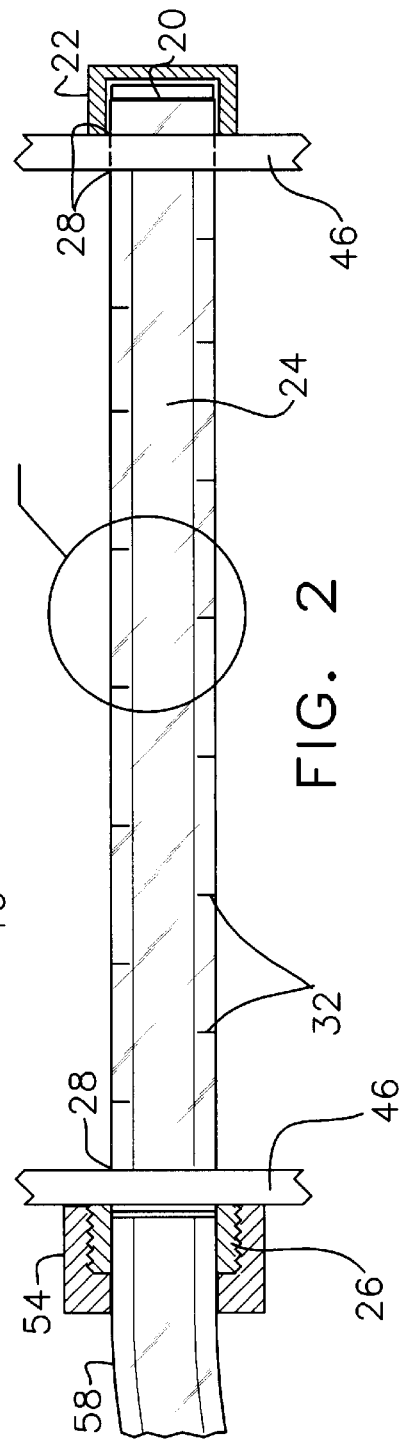
FIG. 2 is a perspective view of a side-light emitting fiber optic cable inserted in a waterfall vessel with the light source provided at one end.

FIGS. 2–3 depict the side-light emitting fiber optic cable 24 longitudinally disposed between the first and second side ends 46 of the waterfall vessel 14. The cable 24 extends through apertures at both first and second side ends 46. A mirror 20 is juxtaposed to an end of the side-light emitting fiber optic cable 24; the mirror is directed to reflect back toward the end of the cable. The back of the mirror 20 is preferably adhesively secured to the end of the cable prior to inserting the cable end into a cap. Cement may be added to the inside of the cap prior to covering the end of the cable 24 and mirror 20. The cap is sealingly engaged to the outside surface of the vessel side end 46 for preventing water leakage from inside the vessel 14 through the aperture opening surrounding the cable into the environment. Several means to sealingly engage the cap to the side end are known in the art, including PVC cement or a PVC weld 28. An alternative embodiment would provide a cap-like form or receiving cavity integrated with the vessel molding on an inside surface of the vessel end, and the cable and mirror would be placed inside the vessel receiving cavity. The cable 24 is secured through the first end aperture with an adapter 26 which is sealingly engaged to the cable and side end 46. Recommended means of sealingly engaging the adapter to the cable and side end are known in the art, including the use of tight interference fits, o-rings, packing seals, compression fittings, cement, electrical fittings, and combinations thereof. The fiber optic light source 58 is powered by an electrical source not shown. Cuts 32 are depicted in the outer sheathing of cable 24. The cuts provide additional lighting enhancement by creating hot spots from which lighting emanates and illuminates the water flowing through the vessel.

FIG. 4 depicts the above embodiment except that the cable 24 is directed through a clear tube 30 should a user desire to minimize water that might enter the cable 24 through cuts 32. Adapter 26 is sealingly engaged to the clear tube 30 and to cable 24. One method of sealingly engaging the adapter to the clear tube is to provide an adhesive seal or weld 34 with a combination of other known fittings in the art to secure the cable in place. For example, a coupling 54 can be combined with the adapter to secure the cable 24 and fiber optic light source 58. Similarly, the cap 22 can be provided with an adhesive cement or weld 34 to the outside surface of the clear tube 30 extending inside the cap.

Figure 6:
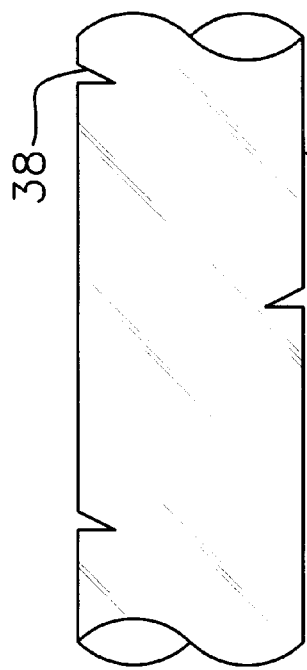
FIG. 6 is a blow-up perspective view of the notches in the clear rod.

FIG. 5 depicts the preferred embodiment wherein a solid clear rod 36 is installed within the vessel instead of a side-light emitting fiber optic cable 24. The cap 22 covers a mirror 20 and the end of an extended portion of the rod 36 and is sealingly engaged to the rod 36 and the side end 46 in the same manner as the cap in FIG. 1. The adapter 26 is sealingly engaged to the side end and the clear rod 36 in the same manner as depicted in FIG. 4; however, a fiber optic light 50 is juxtaposed to the first end of the clear rod 36 in the adapter 26. A coupling 54 with a packing ring or sleeve 48 can be combined with the adapter to secure the fiber optic light in position. Notches 38 as shown in FIG. 6 create hot spots to further enhance the lighting effects.

The cuts 32 or notches 38 are preferably made in a tangential direction and alternating approximately 90° to 180° apart along the rod or side-light emitting cable disposed internally to the vessel between the ends of the vessel.

Figure 7:
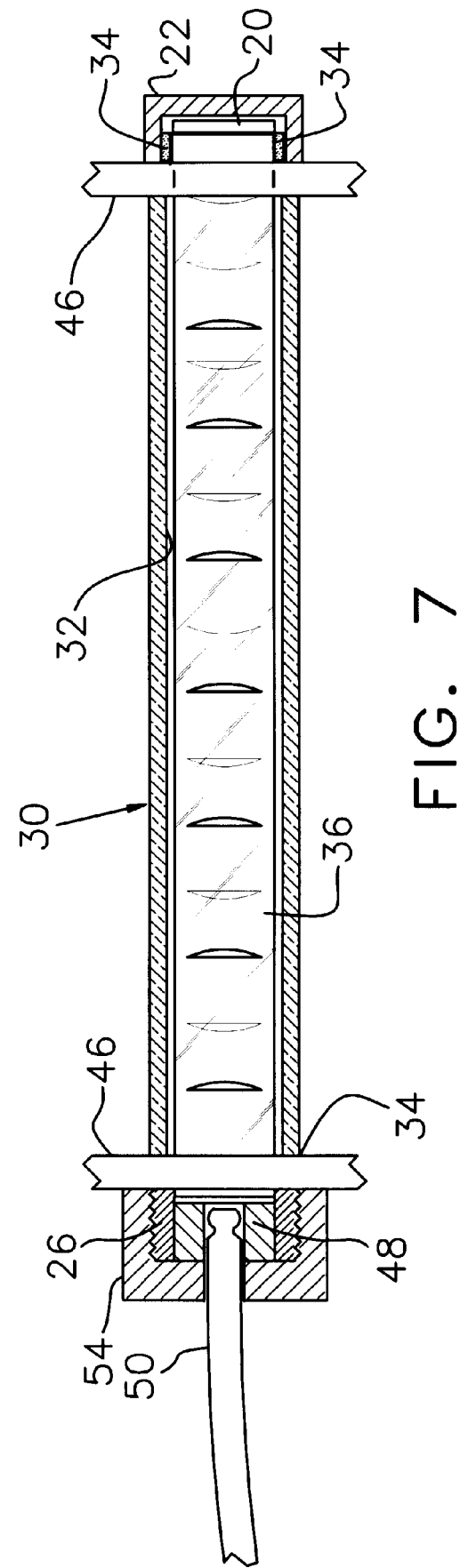
FIG. 7 is a perspective view of the of the clear rod inserted within a clear tube and the light source provided at one end.
Figure 8:
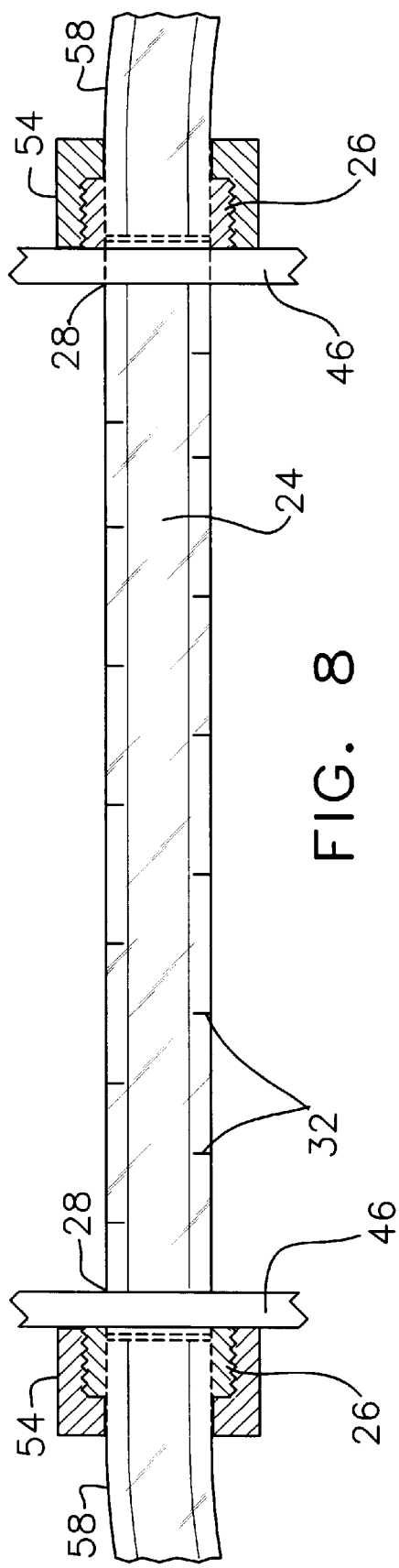
FIG. 8 is a perspective view of a side-light emitting fiber optic cable inserted in a waterfall with the light source provided at both ends.
Figure 9:
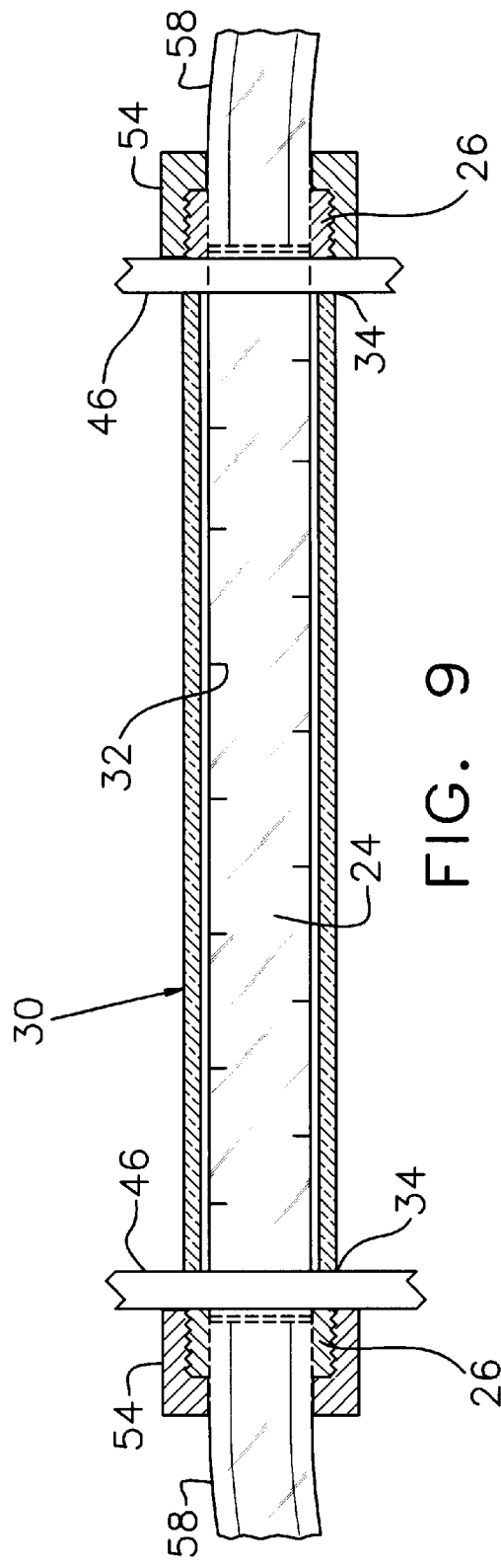
FIG. 9 is a perspective view of the side-light emitting fiber cable inserted within a clear tube with the light source provided at both ends.

FIG. 7 depicts the embodiment as shown in FIG. 5 except that the clear rod 36 is placed within a clear tube similar to the embodiment of FIG. 4 depicting the cable 24 in a clear tube 30. In this embodiment, a fiber optic light 50 is juxtaposed to the end of the clear rod 36.

FIGS. 8–11 depict alternative embodiments to be used with illuminated waterfall boxes in which it is anticipated that a fiber optic light source provided at only one end will provide insufficient lighting emanating from the opposite end. In this case, a fiber optic light source is attached to both ends of the vessel for each respective embodiment depicted in FIGS. 2, 4, 5 and 7. In these embodiments, the cap and mirror are not used. The preferred embodiment is that depicted in FIG. 10.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also understood that the following claims are intended to cover all of the generic and specific features of the invention herein described, and all statements of the scope of the invention which, as a matter of language, might be said to fall therebetween.

Now that the invention has been described,
What is claimed is:

1. An apparatus for creating an illuminated waterfall comprising;

means for changing a columnar flow of incoming water from a water inlet pipe into a shallow stream of water having a predetermined breadth greater than the breadth of the inlet pipe so that a waterfall effect is created, wherein said means has a first end and a second end, each end having apertures therethrough axially aligned with each other and each end further being aligned with a direction of flow of the shallow stream;

a side-light emitting fiber optic cable, the cable being disposed through said first end aperture, through said means for creating the waterfall effect transversely disposed across the direction of water flow, and extending through said second end aperture;

means for providing a light source, an end of the light source being juxtaposed to an end of the side-light emitting fiber optic cable at said first end aperture;

a mirror juxtaposed to an end of the side-light emitting fiber optic cable extending outside said second end aperture, the mirror reflecting toward the end of the cable extending outside said second end aperture;

means for receiving an end of the side-light emitting fiber optic cable and the mirror at said second end aperture and for preventing water leakage between said cable and said second end aperture to the environment;

means for sealingly engaging the side-light emitting fiber optic cable passing through said first end aperture and for preventing water leakage between said cable and first end aperture; and a plurality of tangential inward cuts in an outside sheathing of said cable, the cuts alternating approximately 90° to 180° apart along a portion of the cable disposed between said first and second ends of the means for creating the waterfall effect.

2. The apparatus for creating an illuminated waterfall according to claim 1 wherein the means for creating the waterfall effect comprises:

a waterfall vessel having a top wall, a bottom wall, a front wall and said first and second ends;

an inlet opening for incoming columnar water flow into said vessel;

an outlet opening for water flow exiting in the form of a waterfall; and a plurality of longitudinally disposed baffles in said vessel for suppressing turbulence of said incoming water.

3. The apparatus for creating an illuminated waterfall according to claim 2 wherein the plurality of baffles interconnect with each other, said baffles further comprising a plurality of apertures for directing the flow of water from the inlet opening, through the baffles, to the outlet opening and for suppressing water turbulence.

4. The apparatus for creating an illuminated waterfall according to claim 2 further including means for reflecting and enhancing emitted light along the length of the cable wherein the means includes a reflective film adhesively secured to portions of inside surfaces of the baffles, front wall, back wall, and bottom wall juxtaposed to said sidelight emitting fiber optic cable.

5. The apparatus for creating an illuminated waterfall according to claim 2 wherein the means for receiving an end of the side-emitting fiber optic cable and the mirror at said second end aperture includes a cap disposed over said cable end and mirror, the cap having an inside diameter slightly greater than the diameter of the cable and mirror and wherein the cap is sealingly engaged to an outside surface of the second end of said means for creating the waterfall effect.

6. The apparatus for creating an illuminated waterfall according to claim 5 wherein the mirror is adhesively secured to an end of the side-light emitting cable or adhesively secured to an inside portion of said cap or both.

7. The apparatus for creating an illuminated waterfall according to claim 2 wherein the means for sealingly engaging the side-light emitting fiber optic cable passing through said first end aperture and for maintaining an end of the means for providing the light source juxtaposed to the end of the cable, includes an adapter, the adapter having an inside diameter sufficient to allow the cable to pass through the adapter, the adapter being sealingly engaged to an outside surface of the first end of said means for creating the waterfall effect, the adapter further being sealingly engaged to an outside surface of the cable passing through the adapter, and wherein the adapter couples the end of the light source means to the end of the cable.

8. The apparatus for creating an illuminated waterfall according to claim 1 wherein the means for providing a light source includes a fiber optic light.

9. An apparatus for creating an illuminated waterfall comprising:

means for changing a columnar flow of incoming water from a water inlet pipe into a shallow stream of water having a predetermined breadth greater than the breadth of the inlet pipe so that a waterfall effect is created, wherein said means has a first end and a second end, each end having apertures therethrough axially aligned with each other and each end further being aligned with a direction of flow of the shallow stream;

a clear tube having a first end and a second end, the tube being longitudinally disposed between said first end aperture and second end aperture of the means for creating the waterfall effect and transversely disposed across the direction of water flow, the first and second ends of said tube being in leak tight engagement at said first end aperture and second end aperture respectively;

a side-light emitting fiber optic cable, the cable being disposed through said first end aperture and inside said tube, extending through said means for creating the waterfall effect, and further extending through said second end aperture and ending juxtaposed to the clear tube second end;

means for providing a light source, an end of the fiber optic light source being juxtaposed to an end of the side-light emitting fiber optic cable at said first end aperture;

a mirror juxtaposed to an end of the side-light emitting fiber optic cable extending outside said second end aperture and tube second end, the mirror reflecting toward the end of the cable;

means for receiving an end of the cable and the tube at the second end aperture of the means for creating the waterfall effect and for preventing water leakage between said tube and said second end aperture to the environment;

means for sealingly engaging the cable and tube passing through the first end aperture for preventing water leakage between the cable and clear tube and the first end aperture; and a plurality of tangential inward cuts in an outside sheathing of said cable, the cuts alternating approximately 90° to 180° apart along a portion of said cable disposed inside said clear tube between said first and second ends of the means for creating the waterfall effect.

10. The apparatus for creating an illuminated waterfall according to claim 9 wherein the means for creating the waterfall effect comprises:

a waterfall vessel having a top wall, a bottom wall, a front wall and said first and second ends;

an inlet opening for incoming columnar water flow into said vessel;

an outlet opening for water flow exiting in the form of a waterfall; and a plurality of longitudinally disposed baffles in said vessel for suppressing turbulence of said incoming water.

11. The apparatus for creating an illuminated waterfall according to claim 10 wherein the plurality of baffles interconnect with each other, said baffles further comprising a plurality of apertures for directing the flow of water from the inlet opening through the baffles and to the outlet opening and for suppressing water turbulence.

12. The apparatus for creating an illuminated waterfall according to claim 10 further including means for reflecting and enhancing emitted light along the length of the cable wherein the means includes a reflective film adhesively secured to portions of inside surfaces of the baffles, front wall, back wall, and bottom wall juxtaposed to the clear tube.

13. The apparatus for creating an illuminated waterfall according to claim 10 wherein the means for receiving an end of the cable and tube at the second end aperture includes a cap disposed over the cable, tube and mirror, the cap having an inside diameter slightly greater than the diameter of the tube and mirror and wherein the cap is sealingly engaged to an outside surface of the means for creating the waterfall effect.

14. The apparatus for creating an illuminated waterfall according to claim 10 wherein the means for sealingly engaging the side-light emitting fiber optic cable and clear tube at the first end aperture and for maintaining an end of the means for providing the light source in a position juxtaposed to the cable is an adapter, the adapter being sealingly engaged to an outside surface of the first end of the means for creating the waterfall effect, the adapter further being sealingly engaged to an outside surface of the cable and clear tube for preventing water leakage around said cable and clear tube at said first end aperture, and wherein the adapter couples the end of the light source means to the end of the cable.

15. The apparatus for creating an illuminated waterfall according to claim 12 wherein the mirror is adhesively secured to an end of the side-light emitting cable or adhesively secured to an inside portion of said cap or both.

16. The apparatus for creating an illuminated waterfall according to claim 9 wherein the means for providing a light source includes a fiber optic light.

17. An apparatus for creating an illuminated waterfall comprising:

means for changing a columnar flow of incoming water from a water inlet pipe into a shallow stream of water having a predetermined breadth greater than the breadth of the inlet pipe so that a waterfall effect is created, wherein said means has a first end and a second end, each end having apertures therethrough axially aligned with each other;

a clear rod made from polymeric material having a first end and a second end, the clear rod being disposed through said first end aperture, through said means for creating the waterfall, and extending through said second end aperture;

means for providing a light source, an end of the light source being juxtaposed to the first end of the clear rod at the first end aperture;

a mirror juxtaposed to the second end of the clear rod extending outside said second end aperture, the mirror reflecting toward the second end of the clear rod;

means for receiving an end of the clear rod and mirror at said second end aperture and for preventing water leakage between the clear rod and the second end aperture to the environment;

means for sealingly engaging the clear rod passing through said first end aperture for preventing water leakage between the clear rod and the first end aperture, and for further maintaining an end of the means for providing the light source in a position juxtaposed to the clear rod first end;

a plurality of tangential inward notches in the clear rod, the notches alternating approximately 90° to 180° apart along a portion of clear rod disposed between the first and second ends of the means for creating the waterfall effect; and means for reflecting and enhancing emitted light along the length of the clear rod.

18. The apparatus for creating an illuminated waterfall according to claim 17 wherein the means for creating the waterfall effect comprises:

a waterfall vessel having a top wall, a bottom wall, a front wall and said first and second ends;

an inlet opening for incoming columnar water flow into said vessel;

an outlet opening for water flow exiting in the form of a waterfall; and a plurality of longitudinally disposed baffles in said vessel for suppressing turbulence of said incoming water.

19. The apparatus for creating an illuminated waterfall according to claim 18 wherein the plurality of baffles interconnect with each other, said baffles further comprising a plurality of apertures for directing the flow of water from the inlet opening, through the baffles, to the outlet opening and for suppressing water turbulence.

20. The apparatus for creating an illuminated waterfall according to claim 18 wherein the means for reflecting and enhancing emitted light includes a reflective film adhesively secured to portions of inside surfaces of the baffles, front wall, back wall, and bottom wall juxtaposed to the clear rod.

21. The apparatus for creating an illuminated waterfall according to claim 18 wherein the means for receiving the clear rod end and mirror at said second end aperture includes a cap disposed over the clear rod and mirror, the cap having an inside diameter slightly greater than the diameter of the clear rod and mirror and wherein the cap is sealingly engaged to an outside surface of the second end of said means for creating the waterfall effect.

22. The apparatus for creating an illuminated waterfall according to claim 21 wherein the mirror is adhesively secured to the second end of said clear rod or adhesively secured to an inside portion of the cap or both.

23. The apparatus for creating an illuminated waterfall according to claim 18 wherein the means for sealingly engaging the clear rod passing through said first end aperture and for maintaining an end of the means for providing the light source in a position juxtaposed to the clear rod first end, includes an adapter, wherein the adapter is sealingly engaged to an outside surface of the first end of said means for creating the waterfall effect, the adapter further being sealingly engaged to an outside surface of the clear rod passing through the adapter, and wherein the adapter couples the end of the light source means to the first end of the clear rod.

24. The apparatus for creating an illuminated waterfall according to claim 17 wherein the means for providing a light source includes a fiber optic light.

25. An apparatus for creating an illuminated waterfall comprising:

means for changing a columnar flow of incoming water from a water inlet pipe into a shallow stream of water having a predetermined breadth greater than the breadth of the inlet pipe so that a waterfall effect is created, wherein said means has a first end and a second end, each end having apertures therethrough axially aligned with each other;

a clear tube having a first end and a second end, the tube being longitudinally disposed between said first end aperture and second end aperture of the means for creating the waterfall effect, the first and second ends of said tube being in leak tight engagement at said first end aperture and second end aperture respectively;

a clear rod made from polymeric material having a first end and a second end, the clear rod being disposed through said first end aperture and inside said clear tube, extending through said means for creating the waterfall effect, and further extending through said second end aperture and ending juxtaposed to the clear tube second end;

means for providing a light source, an end to the light source juxtaposed to the first end of the clear rod at the first end aperture;

a mirror juxtaposed to an end of the clear rod extending outside said second end aperture and tube second end, the mirror reflecting toward the end of the clear rod;

means for receiving an end of the clear rod and the clear tube at the second end aperture of the means for creating the waterfall effect and for preventing water leakage to the environment;

means for sealingly engaging the clear rod and clear tube passing through said first end aperture for preventing water leakage between the clear rod and clear tube and the first end aperture, and for further maintaining an end of the means for providing the light source in a position juxtaposed to the clear rod first end;

a plurality of tangential inward notches in the clear rod, the notches alternating approximately 90° to 180° apart along a portion of the clear rod disposed inside the clear tube between said first and second ends of the means for creating the waterfall effect; and means for reflecting and enhancing emitted light along the length of the clear rod.

26. The apparatus for creating an illuminated waterfall according to claim 25 wherein the means for creating the waterfall effect comprises:

a waterfall vessel having a top wall, a bottom wall, a front wall and said first and second ends;

an inlet opening for incoming columnar water flow into said vessel;

an outlet opening for water flow exiting in the form of a waterfall; and a plurality of longitudinally disposed baffles in said vessel for suppressing turbulence of said incoming water.

27. The apparatus for creating an illuminated waterfall according to claim 26 wherein the plurality of baffles interconnect with each other, said baffles further comprising a plurality of apertures for directing the flow of water from the inlet opening through the baffles and to the outlet opening and for suppressing water turbulence.

28. The apparatus for creating an illuminated waterfall according to claim 26 wherein the means for reflecting and enhancing emitted light includes a reflective film adhesively secured to portions of inside surfaces of the baffles, front wall, back wall, and bottom wall juxtaposed to the clear tube.

29. The apparatus for creating an illuminated waterfall according to claim 26 wherein the means for receiving the clear rod end and clear tube at the second end aperture includes a cap disposed over the clear rod, mirror and clear tube, the cap having an inside diameter slightly greater than the diameter of the tube and mirror and wherein the cap is sealingly engaged to an outside surface of the means for creating the waterfall effect.

30. The apparatus for creating an illuminated waterfall according to claim 26 wherein the means for sealingly engaging the clear rod and clear tube at the first end aperture and for maintaining an end of the means for providing the light source in a position juxtaposed to the clear rod first end includes an adapter, wherein the adapter is sealingly engaged to an outside surface of the first end of the means for creating the waterfall effect, the adapter further being sealingly engaged to an outside surface of the clear rod and clear tube for preventing water leakage around the clear rod and clear tube at the first end aperture, and wherein the adapter couples the end of the light source means to the first end of the clear rod.

31. The apparatus for creating an illuminated waterfall according to claim 29 wherein the mirror is adhesively secured to the second end of said clear rod or adhesively secured to an inside portion of the cap or both.

32. The apparatus for creating an illuminated waterfall according to claim 25 wherein the means for providing a light source includes a fiber optic light.

33. An apparatus for creating an illuminated waterfall comprising:

means for changing a columnar flow of incoming water from a water inlet pipe into a shallow stream of water having a predetermined breadth greater than the breadth of the inlet pipe so that a waterfall effect is created, wherein said means has a first end and a second end, each end having apertures therethrough axially aligned with each other;

a side-light emitting fiber optic cable, the cable being disposed through said first end aperture, through said means for creating the waterfall effect, and extending through said second end aperture;

means for providing a light source to each end of the side-light emitting fiber optic cable;

means for sealingly engaging the side-light emitting fiber optic cable passing through said first end and second end apertures and for preventing water leakage between said cable and first end and second end apertures;

a plurality of tangential inward cuts in an outside sheathing of said cable, the cuts alternating approximately 90° to 180° apart along a portion of the cable disposed between said first and second ends of the means for creating the waterfall effect; and means for reflecting and enhancing emitted light along the length of said cable.

34. The apparatus for creating an illuminated waterfall according to claim 33 wherein the means for creating the waterfall effect comprises:

a waterfall vessel having a top wall, a bottom wall, a front wall and said first and second ends;

an inlet opening for incoming columnar water flow into said vessel;

an outlet opening for water flow exiting in the form of a waterfall; and a plurality of longitudinally disposed baffles in said vessel for suppressing turbulence of said incoming water.

35. The apparatus for creating an illuminated waterfall according to claim 34 wherein the plurality of baffles interconnect with each other, said baffles further comprising a plurality of apertures for directing the flow of water from the inlet opening, through the baffles, to the outlet opening and for suppressing water turbulence.

36. The apparatus for creating an illuminated waterfall according to claim 34 wherein the means for reflecting and enhancing emitted light includes a reflective film adhesively secured to portions of inside surfaces of the baffles, front wall, back wall, and bottom wall juxtaposed to said side-light emitting fiber optic cable.

37. The apparatus for creating an illuminated waterfall according to claim 34 wherein the means for sealingly engaging the side-light emitting fiber optic cable passing through said first end and second end apertures and for maintaining an end of the means for providing the light source juxtaposed to each end of the cable, includes an adapter, each adapter having an inside diameter sufficient to allow the cable to pass through the adapter, the adapter being sealingly engaged to an outside surface of each end of said means for creating the waterfall effect, the adapter further being sealingly engaged to an outside surface of the cable passing through the adapter, and wherein each adapter couples the end of the light source means to the end of the cable.

38. The apparatus for creating an illuminated waterfall according to claim 33 wherein the means for providing a light source to each end of the side-light emitting fiber optic cable includes a fiber optic light.

39. An apparatus for creating an illuminated waterfall comprising:

means for changing a columnar flow of incoming water from a water inlet pipe into a shallow stream of water having a predetermined breadth greater than the breadth of the inlet pipe so that a waterfall effect is created, wherein said means has a first end and a second end, each end having apertures therethrough axially aligned with each other;

a clear tube having a first end and a second end, the tube being longitudinally disposed between said first end aperture and second end aperture of the means for creating the waterfall effect, the first and second ends of said tube being in leak tight engagement at said first end aperture and second end aperture respectively;

a side-light emitting fiber optic cable, the cable being disposed through said first end aperture and inside said tube, extending through said means for creating the waterfall effect, and further extending through said second end aperture and ending juxtaposed to the clear tube second end;

means for providing a light source to each end of the side-light emitting fiber optic cable;

means for sealingly engaging the cable and tube passing through the first end and second end apertures for preventing water leakage between the cable and clear tube and the first end and second end apertures;

a plurality of tangential inward cuts in an outside sheathing of said cable, the cuts alternating approximately 90° to 180° apart along a portion of said cable disposed inside said clear tube between said first and second ends of the means for creating the waterfall effect; and means for reflecting and enhancing emitted light along the length of said cable.

40. The apparatus for creating an illuminated waterfall according to claim 39 wherein the means for creating the waterfall effect comprises:

a waterfall vessel having a top wall, a bottom wall, a front wall and said first and second ends;

an inlet opening for incoming columnar water flow into said vessel;

an outlet opening for water flow exiting in the form of a waterfall; and a plurality of longitudinally disposed baffles in said vessel for suppressing turbulence of said incoming water.

41. The apparatus for creating an illuminated waterfall according to claim 40 wherein the plurality of baffles interconnect with each other, said baffles further comprising a plurality of apertures for directing the flow of water from the inlet opening through the baffles and to the outlet opening and for suppressing water turbulence.

42. The apparatus for creating an illuminated waterfall according to claim 40 wherein the means for reflecting and enhancing emitted light includes a reflective film adhesively secured to portions of inside surfaces of the baffles, front wall, back wall, and bottom wall juxtaposed to the clear tube.

43. The apparatus for creating an illuminated waterfall according to claim 40 wherein the means for sealingly engaging the side-light emitting fiber optic cable and clear tube at the first end and second end apertures and for maintaining an end of the means for providing the light source in a position juxtaposed to each end of the cable is an adapter, each adapter being sealingly engaged to an outside surface of each end of the means for creating the waterfall effect, the adapter further being sealingly engaged to an outside surface of the cable and clear tube for preventing water leakage around said cable and clear tube at said first end and second end apertures, and wherein the adapter couples the end of the light source means to each end of the cable.

44. The apparatus for creating an illuminated waterfall according to claim 39 wherein the means for providing a light source to each end of the side-light emitting cable includes a fiber optic light.

45. An apparatus for creating an illuminated waterfall comprising:
   means for changing a columnar flow of incoming water from a water inlet pipe into a shallow stream of water having a predetermined breadth greater than the breadth of the inlet pipe so that a waterfall effect is created, wherein said means has a first end and a second end, each end having apertures therethrough axially aligned with each other;
   a clear rod made from polymeric material having a first end and a second end, the clear rod being disposed through said first end aperture, through said means for creating the waterfall, and extending through said second end aperture;
   means for providing a light source to each end of the clear rod, an end of the light source being juxtaposed to each end of the clear rod at the first end and second end apertures;
   means for sealingly engaging the clear rod passing through said first end and second end apertures for preventing water leakage between the clear rod and the first end and second end apertures, and for further maintaining an end of the means for providing the light source in a position juxtaposed to the clear rod first end and second end;
   a plurality of tangential inward notches in the clear rod, the notches alternating approximately 90° to 180° apart along a portion of clear rod disposed between the first and second ends of the means for creating the waterfall effect; and
   means for reflecting and enhancing emitted light along the length of the clear rod.

46. The apparatus for creating an illuminated waterfall according to claim 45 wherein the means for creating the waterfall effect comprises:
   a waterfall vessel having a top wall, a bottom wall, a front wall and said first and second ends;
   an inlet opening for incoming columnar water flow into said vessel;
   an outlet opening for water flow exiting in the form of a waterfall; and
   a plurality of longitudinally disposed baffles in said vessel for suppressing turbulence of said incoming water.

47. The apparatus for creating an illuminated waterfall according to claim 46 wherein the plurality of baffles interconnect with each other, said baffles further comprising a plurality of apertures for directing the flow of water from the inlet opening, through the baffles, to the outlet opening and for suppressing water turbulence.

48. The apparatus for creating an illuminated waterfall according to claim 46 wherein the means for reflecting and enhancing emitted light includes a reflective film adhesively secured to portions of inside surfaces of the baffles, front wall, back wall, and bottom wall juxtaposed to the clear rod.

49. The apparatus for creating an illuminated waterfall according to claim 46 wherein the means for sealingly engaging the clear rod passing through said first end and second end apertures and for maintaining an end of the means for providing the light source in a position juxtaposed to the clear rod first end and second end, includes an adapter, wherein the adapter is sealingly engaged to an outside surface of each end of said means for creating the waterfall effect, the adapter further being sealingly engaged to an outside surface of the clear rod passing through the adapter, and wherein each adapter couples the end of the light source means to the first end and second end of the clear rod.

50. The apparatus for creating an illuminated waterfall according to claim 45 wherein the means for providing a light source to each end of the clear rod includes a fiber optic light.

51. An apparatus for creating an illuminated waterfall comprising:
   means for changing a columnar flow of incoming water from a water inlet pipe into a shallow stream of water having a predetermined breadth greater than the breadth of the inlet pipe so that a waterfall effect is created, wherein said means has a first end and a second end, each end having apertures therethrough axially aligned with each other;
   a clear tube having a first end and a second end, the tube being longitudinally disposed between said first end aperture and second end aperture of the means for creating the waterfall effect, the first and second ends of said tube being in leak tight engagement at said first end aperture and second end aperture respectively;
   a clear rod made from polymeric material having a first end and a second end, the clear rod being disposed through said first end aperture and inside said clear tube, extending through said means for creating the waterfall effect, and further extending through said second end aperture and ending juxtaposed to the clear tube second end;
   means for providing a light source to each end of the clear rod, an end to the light source juxtaposed to each end of the clear rod at the first end and second end apertures;
   means for sealingly engaging the clear rod and clear tube passing through said first end aperture and second end apertures for preventing water leakage between the clear rod and clear tube and the first end aperture, and for further maintaining an end of the means for providing the light source in a position juxtaposed to each end of the clear rod;
   a plurality of tangential inward notches in the clear rod, the notches alternating approximately 90° to 180° apart along a portion of the clear rod disposed inside the clear tube between said first and second ends of the means for creating the waterfall effect; and means for reflecting and enhancing emitted light along the length of the clear rod.

52. The apparatus for creating an illuminated waterfall according to claim 51 wherein the means for creating the waterfall effect comprises:

a waterfall vessel having a top wall, a bottom wall, a front wall and said first and second ends;

an inlet opening for incoming columnar water flow into said vessel;

an outlet opening for water flow exiting in the form of a waterfall; and a plurality of longitudinally disposed baffles in said vessel for suppressing turbulence of said incoming water.

53. The apparatus for creating an illuminated waterfall according to claim 52 wherein the plurality of baffles interconnect with each other, said baffles further comprising a plurality of apertures for directing the flow of water from the inlet opening through the baffles and to the outlet opening and for suppressing water turbulence.

54. The apparatus for creating an illuminated waterfall according to claim 52 wherein the means for reflecting and enhancing emitted light includes a reflective film adhesively secured to portions of inside surfaces of the baffles, front wall, back wall, and bottom wall juxtaposed to the clear tube.

55. The apparatus for creating an illuminated waterfall according to claim 52 wherein the means for sealingly engaging the clear rod and clear tube at the first end and second end apertures and for maintaining an end of the means for providing the light source in a position juxtaposed to each end of the clear rod includes an adapter, wherein the adapter is sealingly engaged to an outside surface of each end of the means for creating the waterfall effect, the adapter further being sealingly engaged to an outside surface of the clear rod and clear tube for preventing water leakage around the clear rod and clear tube at the first end and second end apertures, and wherein the adapter couples the end of the light source means to each end of the clear rod.

56. The apparatus for creating an illuminated waterfall according to claim 51 wherein the means for providing a light source to each end of the clear rod includes a fiber optic light.

* * * * *

UNITED STATES PATENT AND TRADEMARK OFFICE
CERTIFICATE OF CORRECTION

PATENT NO : 6,132,056
DATED : October 17, 2000
INVENTOR(S) : Douglas Ruthenberg

It is certified that error appears in the above-identified patent and that said Letters Patent are hereby corrected as shown below:

On title page, item 57 Abstract
replace "pack"
with --back--.

Signed and Sealed this

Eighth Day of May, 2001

Attest:

NICHOLAS P. GODICI

Attesting Officer     Acting Director of the United States Patent and Trademark Office